_3,564,028_
PROCESS FOR THE PREPARATION OF MINERAL OXY-ACID ESTERS OF 9α-FLUORO-16-METHYL-PREDNISOLONE
Joao Villax, Travessa do Ferreiro, a Lapa 1, Lisbon 3, Portugal
No Drawing. Continuation of application Ser. No. 761,020, Aug. 6, 1968, which is a continuation-in-part of application Ser. No. 630,787, Apr. 11, 1967, which in turn is a continuation-in-part of application Ser. No. 178,545, Mar. 9, 1962. This application Oct. 6, 1969, Ser. No. 871,736
Int. Cl. C07c _169/32_
U.S. Cl. 260—397.45                    1 Claim

ABSTRACT OF THE DISCLOSURE

Mineral oxy-acid esters of corticosteroids are prepared by reacting a lower alkyl chlorocarbonate with either sulfuric acid, or orthophosphoric acid, or their alkali or alkaline earth metal salts, in presence of a tertiary amine, and then reacting the resulting lower alkyl carbonic acid ester with the corticosteroid, such as prednisolone or its fluoro derivatives. New steroids produced by this reaction include the 21-sulfuric acid ester, and 21-phosphoric acid ester of 9α-fluoro-16β-methyl-prednisolone and their sodium salts, which are useful for the remission of pain, bleeding tendency, and fever, in a variety of pathological conditions, being also powerful anti-inflammatory agents. The 21-sulfuric acid ester of 9α-fluoro-16β-methyl-prednisolone exhibits a prolonged anti-inflammatory action, more than twice the duration of the corresponding 21-phosphate, and is especially useful for formulating long-acting corticosteroid preparations.

CROSS-REFERENCE TO RELATED APPLICATIONS

This application is a continuation of application Ser. No. 761,020 filed Aug. 6, 1968, now abandoned which is a continuation-in-part of application Ser. No. 630,787 filed Apr. 11, 1967, now abandoned, which in turn is a continuation-in-part of application Ser. No. 178,545 filed Mar. 9, 1962, now abandoned.

BACKGROUND OF THE INVENTION

The 21-acylation of corticosteroids is very difficult to perform, and reaction conditions must be carefully chosen so as to avoid an enol-acylation of the keto groups present, and the elimination of the 11β-hydroxy group when present. The esterification of the 21-hydroxy group of corticosteroids by sulfuric and phosphoric acids presents even more pronounced difficulties.

The majority of known esterification processes do not permit isolation of the desired products, due either to lack of reaction, destruction of the corticosteroid molecule, or to undesirable side reactions.

The 21-acylates of corticosteroids, especially the 21-acetates, are well known. They are water insoluble, similar to the corresponding parent compounds having a free hydroxy group at the 21-position. The acylates can be prepared conveniently from the 21-hydroxy compounds by effecting a simultaneous purification, or may be obtained directly from the corresponding 21-halo pregnanes by reaction with sodium or potassium acetate. The 21-acetates, however, do not possess any superiority from a pharmacological point of view over the corticosteroids having a free 21-hydroxy group. The 21-esterification of 9α-fluoro-16β-methyl-prednisolone, particularly the esterification with sulfuric or phosphoric acids, by known methods, is extremely difficult.

Thus, the water soluble derivatives of phosphoric and sulfuric acid esters of prednisolone are known, and moreover, K. Irmscher has disclosed in "Chemistry and Industry," July 8, 1961, page 1035, a process for preparing 21-phosphates of a series of corticosteroids, including 9α-fluoro-16α-methyl-prednisolone, by reacting the corticosteroid with phosphoryl dimorpholido chloride. However, the attempted application of this process to a 9α-fluoro-16β-methyl-prednisolone gives unsatisfactory results, due to a failure of the phosphoryl dimorpholida chloride to react when the 16-methyl group is in the β position. When applying a longer reaction time or higher reaction temperatures, destruction of the 17-side chain is observed.

SUMMARY OF THE INVENTION

The present invention relates to the preparation of esters of mineral oxyacids with corticosteroids, more particularly of 21-sulfuric and 21-phosphoric acid esters of prednisolone, 9α-fluoro-16α-methyl-prednisolone and the new hitherto undisclosed 21-sulfates and phosphates of 9α-fluoro-16β-methyl-prednisolone, together with their sodium salts. These sodium salts of 21-sulfuric and phosphoric acid esters of the corticosteroids being water soluble, in contrast to the parent compounds or to the 21-acylates of the same, represent a considerable advantage as they permit the preparation of stable aqueous solutions for parenteral administration and are also better absorbed when administered orally or topically due to their high solubility in water.

Furthermore, it has been found that the 9α-fluoro-16-β-methyl-prednisolone 21-phosphate sodium surprisingly exerts a higher and better pharmacological and clinical activity than its 16α-methyl isomer, thus permitting reduction of the dosage, including that of maintenance, by forty to sixty percent, hence improving considerably its chemotherapic index in comparison to that of the 16α-methyl isomer, and representing a further decrease in the occurrence of already slight secondary effects.

The majority of known esterification processes do not permit to isolate the desired final products, due either to lack of reaction, destruction of the corticosteroid molecule or to undesirable side reactions, including the D-homo annulation.

The present invention provides a process which avoids the previously mentioned difficulties and offers the following advantages: (1) fast reaction at low temperatures, (2) no reaction equilibrium, i.e., the reaction is in itself irreversible, and (3) the reaction occurs within a large pH range, including neutral or slightly alkaline pH values. Thus, according to the invention, the preparation of the 21-sulfuric and phosphoric acid esters of corticosteroids is fast due to a short reaction time at low temperatures with high yields. Furthermore, the process avoids the undesirable side reactions, a further feature being that the preparation of the new 21-sulfuric and phosphoric acid esters of 9α-fluoro-16β-methyl prednisolone becomes easily feasible although the 16-methyl group in the β-position renders the introduction of these substituents specially difficult, possibly due to steric hindrance.

The invention provides a method for the preparation of water soluble sodium salts of sulfuric and phosphoric acid esters of prednisolone, 9α-fluoro-16α-methyl prednisolone, and more specially those of 9α-fluoro-16β-methyl-prednisolone.

While the 21-phosphate of 9α-fluoro-16α-methyl prednisolone proved as fully active as the parent corticosteroid according to Irmscher, it was found that the 21-phosphoric acid ester of 9α-fluoro-16β-methyl prednisolone and both the mono or disodium salts are in a surprising way superior to the 16α-isomer disclosed by Irmscher and also to the parent compound, these latter due to better absorption specially when administered orally. In clinical trials where the administration of 9α-fluoro-16α-methyl prednisolone 21-phosphate sodium has been substituted by 9α-fluoro-16β-methyl prednisolone-21-phosphate sodium, the minimum maintenance dosage could be diminished by one-third to one-half in order to obtain a similar or a more effective control of the symptoms.

The reaction is carried out by the action of inorganic oxyacid derivatives, having the formula:

where A is the residue of sufuric or phosphoric acid, R is a lower alkyl group of one to eight carbon atoms or a phenyl group, which is reacted afterwards with the corticosteroid to be esterified.

Compounds I are easily prepared by action of the respective acid and a lower alkyl or phenyl halo (preferably chloro) carbonate, having the formula:

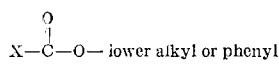

This reaction is carried out by addition of the halocarbonate to the acid in an inert solvent at a low temperature (preferably, 0° C. down to −40° C.), if desired in the presence of a tertiary amine. However, in the majority of the cases, it is preferable to use an alkali metal or earth alkali metal salt of the acid in question, so as to react it with alkyl halocarbonate.

The compounds I have characterized by an enormous reactivity, and, therefore, being rather unstable, they must be used for the production of esters immediately after their preparation.

The esterification occurs according to the following reaction scheme:

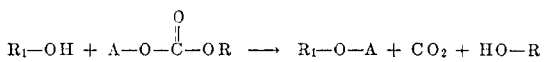

where $R_1$ is the corticosteroid to be esterified without the 21-hydroxy group, A the inorganic acid residue and R a lower alkyl or phenyl group.

During the reaction an alcohol HO—R is formed which reacts with the compounds of Formula I. In order to avoid a decrease in yield of the esterification of the corticosteroids, the cheap compounds I are used in excess and the reaction is carried out in a reaction inert solvent, having preferably a higher ebullition point than R—OH (R—OH is generally methanol or ethanol), thus permitting the elimination of the alcohol (R—OH) immediately as it is formed during the reaction, by means of vacuum and adjusting the vacuum and temperature in such a way that the solvent within which the reaction takes place is not in ebullition but R—OH is. By this process the esterification yield of the corticosteroids is in excess of 65% to 90%.

Inert solvents are those which do not react with the reagents during the reaction and under its conditions. Examples of these solvents include: dimethylformamide, tetrahydrofuran, acetonitrile, chloroform, carbon tetrachloride, 1,2-dimethoxyethane, and acetone.

This reaction of esterification is catalyzed by tertiary amines, and sometimes when the reaction does not begin spontaneously, due to the fact that a very low temperature has been chosen to perform the reaction, a few drops of triethylamine, diluted with the solvent, immediately provoke the beginning of the reaction.

The isolation of the sulfuric or phosphoric acid esters of corticosteroids is preferably carried out by forming the corresponding sodium salts by a careful neutralization of the remaining free acid function or functions with an alcoholic solution of sodium hydroxide or a methanolic solution of sodium methylate, and precipitating successively the sodium salts thus obtained by addition of a non-solvent. By regulating the amount of sodium hydroxide or sodium methylate, the mono or disodium salts, or a mixture of both, of the phosphoric acid esters, can be prepared. However, many other isolation processes may be applied. In order to obtain the ester with a free acid function, the isolation is preferably carried out by extraction of the acid ester into a water miscible organic solvent such as n-butanol, followed by evaporation and crystallization. Numerous different but adequate processes can easily be determined and applied by a person skilled in the art.

The method of the present invention offers the following advantages:

(a) Fast reaction at low temperatures;
(b) No reaction equilibrium, the reaction being substantially irreversible;
(c) No liberation of water; and
(d) Reaction occurs within a wide pH range, but preferably at neutral or slightly alkaline pH.

The compound 9α-fluoro-16β-methyl prednisolone 21-phosphate sodium salt (beta methasone 21-phosphate) is superior in its clinical action and properties to the well known 21-phosphate of dexamethasone, as shown by extensive clinical tests utilizing both oral and parenteral administration. The superiority of the beta methasone 21-phosphate is especially marked in those cases where the patient has shown a diminution in response to previous prolonged corticosteroid therapy, including that with dexamethasone. Therapeutic preparation containing the compounds of the invention are in general better tolerated than other corticosteroids.

In the treatment of such conditions as widespread eczema, ulcerations of the legs in post-phlebitic syndrome, anaphylactic shock, post operative acute glottic edema, hemolytic jaundice, the administration of beta methasone phosphate has produced disappearance of the eczema and remission of the symptoms of the other conditions upon administration for 3 to 10 days, in cases where dexamethasone had produced little or no response. Dosages ranged from 2 mg. to 5 mg. daily.

Moreover, clinical tests have demonstrated that the 9α-fluoro-16β-methyl prednisolone 21-phosphate of the invention is superior to the corresponding 16α-methyl isomer in that in the majority of the cases the former is at least as effective as the latter even when the dosage amounts to the former were reduced approximately to one-half. Furthermore, there are produced either small side effects or no side effects, e.g., no unfavorable effects on blood pressure.

The clinical superiority of the 16β-methyl isomer has been demonstrated by the possibility of reduction of the maintenance dosage in patients previously treated with the 16α-methyl isomer, as shown in Table I.

TABLE I

| Cases | Conditions | Previous treatment with dexamethasone-21-phosphate, sodium | Dosage and administrations form of betamethasone-21-phosphate, sodium | Clinical results |
|---|---|---|---|---|
| 13) L.P.f.9y.o | Leukemia | 10 mg. daily orally | Acute phase, 6 mg. daily orally; maintaining dose, 3 mg, daily. | Remission of symptoms, as more effective than previous therapy in control such as fever and bleeding tendency. |
| 14) M.G.f.44y.o | Metastasis of breast's tumor | 4 mg. daily, orally | Mg. 2, 5 daily, per 4 months | Remission of pain and subjective symptoms; small side effects; better inibition of surrenalis cortex. |
| 15) N.N.f.38y.o | Metastasis of breast's tumor with pain. | 4 mg. daily per 15 days | Mg. 2, 5 daily, per 2 months | Remission of pain and subjective symptoms; no side effects. |
| 16) M.C.f.32y.o | Hodgkin, fevered, acute phase. | Acute phase, 10 mg. daily. | 6 mg. daily | Remission and unfevered in preparation of antimitotic therapy; small side effects. |
| 17) R.W.m.47y.o | Leukemia | 10 mg. daily | Acute phase, 7 mg. daily; maintaining dose, 3 mg. daily. | More effective in control such as fever and bleeding tendency, small side effects. |
| 18) E.S.f.66y.o | Postoperative jaundice by inflammatory stenosis of biliary tract. | 5 mg. daily per 5 days orally. | 4 mg. daily per 10 days i.m. | Release and progressive resolution of jaundice. |

In order to ascertain the superiority of 9-fluoro-16-methyl-prednisolone 21-phosphate sodium over 9-fluoro-16-methyl-prednisolone 21-phosphate sodium, three groups of patients suffering from lumbar sciatica were treated as follows:

(I) 1 cc. of 4.0 mg./cc. 9α-fluoro-16β-methyl-prednisolone 21-phosphate sodium was administered i.m. daily to a group of 12 patients during 3 days, followed by a maintenance dosage of 1 cc. of 4.0 mg./cc. every other day. On the 8th day of treatment the response was the following: Excellent, 6; good, 4; fair, 2.

(II) 1 cc. of 7.0 mg./cc. 9α-fluoro-16α-methyl-prednisolone 21-phosphate sodium was administered i.m. daily to a group of 12 patients during 3 days, followed by a maintenance dosage of 1 cc. of 8.0 mg./cc. every other day. On the 8th day of treatment the response was the following: Excellent, 5; good, 5; fair, 2.

(III) A group of 6 patients received 1 cc. physiological saline injection, according to the schedule observed in Groups I and II. The clinical observations showed the following response on the 8th day of treatment: Excellent, 0; good, 0; fair, 1; no, 5.

After the 8th day of treatment, the patients of Group I were treated every other day with a 1 cc. i.m. injection of 4 mg./cc. 9α-fluoro-16α-methyl-prednisolone 21-phosphate sodium, showing the following response on the 16th day: Excellent, 2; good, 5; fair, 5.

Similarly, after the 8th day of treatment, the patients of Group II were treated every other day with a 1 cc. i.m. injection of 4 mg./cc. 9α-fluoro-16β-methyl-prednisolone 21-phosphate sodium, showing the following clinical response on the 16th day: Excellent, 6; good, 5; fair, 1.

The patients in Group II received from the 8th day onwards 1 cc. of 4 mg./cc. 9α-fluoro-16β-methyl-prednisolone 21-phosphate sodium during 3 days, followed by the same dosage every other day. The response was the following: Excellent, 3; good, 3; fair, 0.

Thus, from a clinical point of view, 0.5 to 0.65 mg. of 9α-fluoro-16β-methyl-prednisolone 21-phosphate sodium in equivalent of 1 mg. of 9α-fluoro-16α-methyl-prednisolone 21-phosphate sodium.

Furthermore, it should be noted that during the oral administration of 9α-fluoro-16β-methyl-prednisolone 21-phosphate sodium no gastric disturbances were observed, due obviously to the excellent dispersion of the product, thus avoiding local concentration of the corticosteroid on the gastric wall, which is likely to occur when water insoluble cortiscosteroids are administered orally.

Prednisolone 21-sulphate sodium, 9α-fluoro-16α-methyl-prednisolone 21-sulphate sodium and 9α-fluoro-16β-methyl-prednisolone 21-sulphate sodium were compared with the equivalent 21-phosphate in the foot oedema test, by administering subcutaneously the steroids to be tested 30 minutes prior to the plantar injection of 0.1 cc. of 0.2% formaldehyde solution, and measuring the swelling of the foot at 1, 2, 3 and 6 hours after the steroid administration. On basis of the parallel test (in each group 18 male rats weighing between 240–280 grs. were used), the quantitative equivalency of these hydrosoluble steroid compounds in the test was calculated, which is summarised as follows:

| | 21-phosphate | 21-sulphate, mcg. |
|---|---|---|
| Prednisolone | 1 mcg., equivalent to | 1.7. |
| 16α-methyl-9α-fluoroprednisolone | do | 1.78 |
| 16β-methyl-9α-fluoroprednisolone | do | 1.69. |

Thus, the 21-sulphates exert the same action as the 21-phosphates during the first 6 hours after administration, provided that they are administered in about 80% excess over the phosphates. However, the action of the phosphates ceased after 6 to 7 hours of administration, whilst the equivalent sulphate derivatives maintained their anti-inflammatory activity for 12 to 14 hours, even if the plantar formaldehyde injection had been repeated after 7 hours. Thus, the sulphates exert an unexpected protracted action, and are specially useful in formulating long action corticosteroid preparations.

If it is attempted to prepare 9α-fluoro-16β-methyl prednisolone by the process disclosed in the article by Irmscher, previously referred to, unsatisfactory results are obtained and moreover it is impossible to isolate the corresponding 21-phosphate from the reaction mixture. This is believed to be due to the well known phenomenon in steroid chemistry that the presence of a substituent in the 16-position as well as the steric position of such a substituent, greatly influences the chemical behaviour of the 17-side chain group and the D-ring. (See Taub et al., J.A.C.S., 82, 4012–26 (1960).) Thus, the disclosure of the Irmscher article does not teach the preparation of the 21-phosphates of 9α-fluoro-16β-methyl prednisolone, nor does it provide a practical route to such preparation.

In the article by Oliveto et al., J.A.C.S. 80, 6687 (1958) there is disclosed 9α-fluoro-16β-methyl prednisolone 21-acetate which is said to have glucocorticoid and anti-inflammatory activity. However, the 21-acetate is not equivalent chemically to the 21-phosphate of the invention, since the former is water insoluble and is a carboxylic acid ester which does not form metal salts, whereas the 21-phosphate is an inorganic oxy-acid ester, which forms a sodium salt, which salt is water soluble. If it is attempted by analogy to utilize the process employed by Oliveto et al. in preparing the 21-acetate, to prepare the 21-phosphate by substituting potassium phosphate for potassium acetate, the 21-phosphate is not obtained.

The Oliveto article states that the physiological properties of 9α-fluoro-16β-methyl prednisolone 21-acetate in man appear to be quantitatively similar to those of the 16α-methyl isomer. However, this similarity is emphatically not true with respect to the 21-phosphoric acid ester sodium salt of the 16β-methyl isomer as compared with that of the 16α-methyl isomer, as demonstrated by clinical tests. Moreover, the 16β-methyl isomer 21-phosphate disodium salt of the invention differs essentially in its physiologicol behavior from the 16α-methyl isomer in that it is useful for the remission of pain, bleeding tendency and fever, in certain pathological cases where the α-isomer exerted no or little effect.

DESCRIPTION OF THE PREFERRED EMBODIMENTS

The following examples illustrate the practice of the invention but are not to be regarded as limiting:

Example 1

2.5 cc. o-phosphoric acid (85%) are dehydrated at 150° C. under vacuum. It is then cooled and 21.5 cc. acetonitrile nad 5.3 cc. triethylamine are added. The mixture is then cooled down to −20° C. and 4.3 cc. ethyl chlorcarbonate in 5 cc. acetonitrile are added. The mixture is stirred for a quarter of an hour followed by the addition of 3.6 gr. prednisolone in 16.5 cc. acetonitrile and then 5.3 cc. triethylamine. The mixture is stirred until there is no more gas development and then it is refluxed for 1 hour. 28.6 cc. methanol and 38.5 cc. 2 N methoxide of sodium in methanol are added. It is filtered. The filtrate is concentrated down to 33 cc. and 400 cc. ethyl ether are added, which precipitates the sodium salt of prednisolone-21-phosphate. It is dried in a desiccator. Yield 66%. Melting point around 200° C. with previous decomposition. Optical rotation /α/$_D$+105 (C, 1 in water). Absorption maximum in ultraviolet $E_{1cm.}^{1\%}$ 306 at 239–242 mμ in methanol.

Example 2

Proceeding as in Example 1, but using instead of prednisolone, there were reacted 4 gr. of 9-α-fluoro-16β-methyl prednisolone. Yield 75%. The optical rotation of the 21-phosphoric acid ester of 9-α-fluoro-16β-methyl prednisolone sodium salt, thus obtained, is /α/$_D$+110 (C, 1 in water);

$E_{1cm.}^{1\%}$ 288 at 238 mμ in methanol.

Example 3

Example 1 is repeated, but instead of o-phosphoric acid, there is used 3.0 gr. concentrated suyphuric acid without dehydration. The sodium salt of prednisolone-21-sulphate is obtained. /α/$_D$+110 (C, 0.66 in water);

$E_{1cm.}^{1\%}$ 312 at 239–241 mμ in methanol.

Example 4

Example 3 is repeated, but instead of prednisolone, there is reacted 4 gr. 9α-fluoro-16α-methyl prednisolone. Yield 79%. The optical rotation of the 21-sulphuric acid ester of 9-fluoro-16α-methyl prednisolone sodium salt is /α/$_D$+80 (C, 1 in water);

$E_{1cm.}^{1\%}$ 292 at 238 mμ in methanol.

Example 5

Example 4 is repeated, but instead of the 16α-isomer, there is reacted 16β-isomer. The optical rotation of the 21-sulphuric acid ester of 9α-fluoro-16β-methyl prednisolone sodium salt is /α/$_D$+95 (C, 1 in water);

$E_{1cm.}^{1\%}$ 291 at 238 mμ in methanol.

Example 6

2.5 cc. o-phosphoric acid (85%) is dehydrated at 150° C. under vacuum. It is then cooled and 21.5 cc. acetonitrile and 5.3 cc. triethylamine are added. The mixture is then cooled down to −20° C. and 4.3 cc. ethylchlorocarbonate in 5 cc. acetonitrile are added. It is stirred for a quarter of an hour followed by the addition of 3 gr. 9α-fluoro-16β-methyl prednisolone in 16.5 cc. acetonitrile and then 5.3 cc. triethylamine. The mixture is slowly heated to +40° C. for 1 hour and the vacuum is regulated in such a way that within that time the reaction mixture is concentrated to one third. 50 cc. methanol and 38.5 cc. 2 N sodium methylate in methanol are added. It is filtered. The filtrate is concentrated to 33 cc. and 400 cc. isopropylether are added, which precipitates the 21-phosphoric acid ester of 9α-fluoro-16β-methyl prednisolone sodium salt. Yield 80%.

Example 7

One proceeds as in Example 6, but reacts the 16α instead of the 16β-isomer. The optical rotation of the 21-phosphoric acid ester of 9α-fluoro-16α-methyl prednisolone sodium salt, thus obtained, is [α]$_D$ +83 (C, 1 in water);

$E_{1cm.}^{1\%}$ 288 at 238 mμ in methanol.

Example 8

Four groups of 8 male rats, weighting 120–140 grs. each, were submitted to the foot edema test. Thirty minutes prior to the plantar injection of 0.1 cc. of 5% formaldehyde solution, 5 mg./kg. of 9α-fluoro-16α-methyl prednisolone 21-phosphate sodium were administered orally through tubage to the first group, 5 mg./kg. of 9α-fluoro-16β-methyl prednisolone 21-phosphate sodium to the second group, and to the third 2.5 mg./kg. of 9α-fluoro-16β-methyl prednisolone 21-phosphate sodium, while the fourth group were not treated. The volume of the foot was determined prior to administration and two and a half hours after the formaldehyde injection, and the swelling expressed in percent of increase of the original volume, the average values obtained being as follows:

|   | Average of swelling in percent of the original volume of the foot after 2h30m |
|---|---|
| 1st group | 28.3 |
| 2nd group | 17.6 |
| 3rd group | 29.2 |
| Control | 48.8 |

Thus, according to the test, half the amount of 9α-fluoro-16β-methyl prednisolone 21-phosphate sodium exerts approximately the same order of control of swelling as the respective 16-α-isomer.

What is claimed is:

1. Process for preparation of esters of mineral oxyacids which comprises reacting, at a temperature between about −40° C. and about 50° C., under anhydrous conditions, with a lower alkyl chlorocarbonate, a member selected from the group consisting of sulphuric acid, orthophosphoric acid, and the alkali metal and alkaline earth metal salts thereof, in the presence of a tertiary amine, and then reacting the resulting lower alkyl carbonic acid ester with a compound selected from the group consisting of prednisolone, 9α-fluoro-16α-methyl prednisolone, and 9α-fluoro-16-β-methyl prednisolone.

References Cited

FOREIGN PATENTS 1,066,581  12/1958  Germany _____ 260—397.45

OTHER REFERENCES

Oliveto et al.: "JACS," vol. 80 (1958), pp. 6687–6688 relied on.

Irmscher: "Chemistry and Industry," July 8, 1964, p. 1035 relied on.

ELBERT L. ROBERTS, Primary Examiner

U.S. Cl. X.R.

424—243